(No Model.)

C. D. HASKINS.
MULTIPLE SERIES SYSTEM OF ELECTRICAL DISTRIBUTION.

No. 589,429.      Patented Sept. 7, 1897.

WITNESSES:
D. W. C. Danner
John W. Sinclair

INVENTOR:
CHARLES D. HASKINS.
BY Bartow Brown
ATTORNEYS.

UNITED STATES PATENT OFFICE.

CHARLES D. HASKINS, OF BROOKLYN, NEW YORK, ASSIGNOR TO THE WESTERN ELECTRIC COMPANY, OF CHICAGO, ILLINOIS.

MULTIPLE-SERIES SYSTEM OF ELECTRICAL DISTRIBUTION.

SPECIFICATION forming part of Letters Patent No. 589,429, dated September 7, 1897.

Application filed June 8, 1896. Serial No. 594,705. (No model.)

*To all whom it may concern:*

Be it known that I, CHARLES D. HASKINS, a citizen of the United States, residing at Brooklyn, in the county of Kings and State of New York, have invented a certain new and useful Improvement in Automatic Regulating Devices for Multiple-Series Systems of Electrical Distribution, (Case No. 15,) of which the following is a full, clear, concise, and exact description, reference being had to the accompanying drawings, forming a part of this specification.

My invention relates to improvements in an automatic regulating device for multiple-series systems of electrical distribution.

The object of my invention is to provide simple and efficient means for insuring the prompt regulation of such systems.

The device herein described is adapted for use in connection with a system which does not employ a divided source of energy, the regulation being accomplished by cutting varying resistance into or out of circuit between the compensating conductor of said system and one supply-main or the other, as the load predominates upon the opposite side of said compensating conductor. The apparatus I employ for automatically accomplishing this regulation consists of an electromagnet provided with differential windings, the said windings being connected between the mains in multiple series and in parallel between the compensating conductor and the said mains. A contact-arm, with which is connected the compensating conductor, is adapted to be actuated by the magnet when the same is energized by any increase in current flowing in one or the other of its coils to connect the said compensating conductor with the main corresponding to the energized coil of the magnet through graduated resistance proportional to the lack of balance which may at the time exist in the system, whereby the magnet is energized.

I will explain my invention more in detail as applied to a system of electrical distribution employing three wires, by reference to the accompanying drawings, in which—

Figure 1:
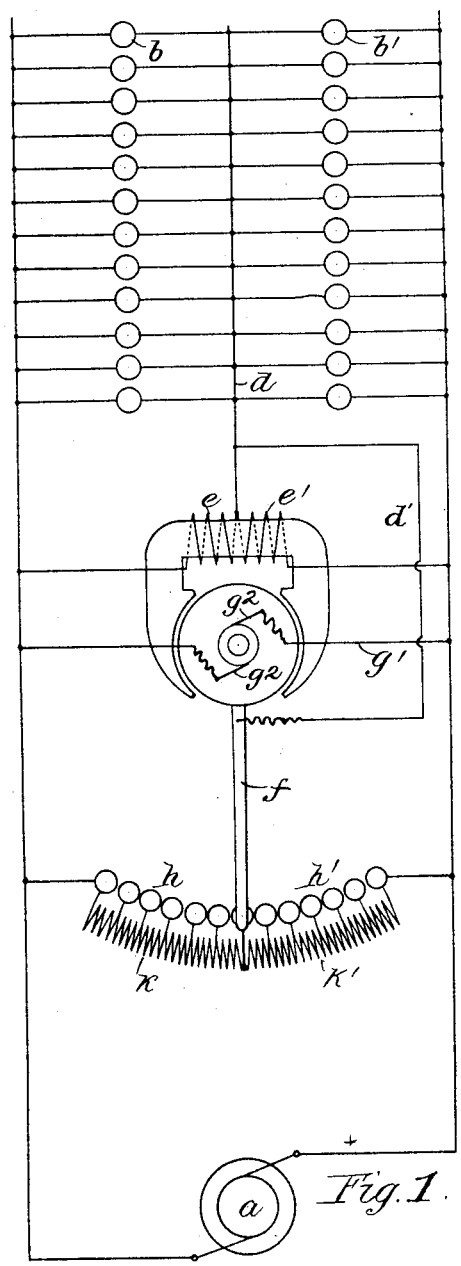
Figure 2:
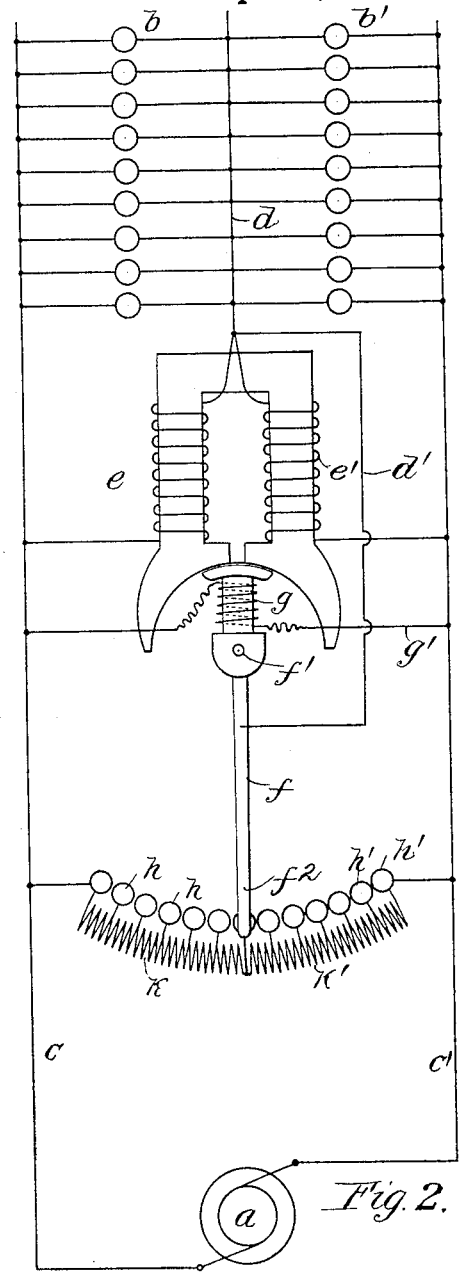
Figure 3:
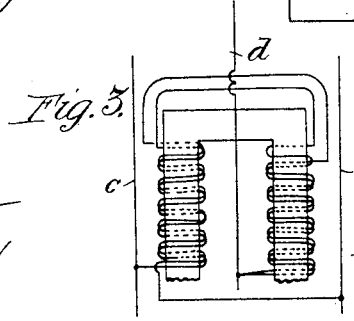

Figure 1 illustrates, diagrammatically, one form of my device connected with a multiple-series system. Fig. 2 shows another form of my device similarly connected, and Fig. 3 diagrammatically illustrates an actuating-magnet supplied with duplex windings.

The same parts are designated by like letters of reference throughout the several figures.

The dynamo or other source of electrical energy $a$ is connected with the translating devices $b$ $b'$ by mains $c$ $c'$. A compensating conductor $d$ is provided, between which and the mains the translating devices are connected in parallel, so that approximately equal loads $b$ and $b'$ are disposed upon either side of the said wire $d$. Coils $e$ $e'$ of the regulating device are respectively connected between main $c$ and wire $d$ and main $c'$ and wire $d$, the said coils being differentially wound. Wire $d'$ serves to connect the contact-arm $f$ of the regulating device with wire $d$. Upon the upper end of the contact-arm, which is pivoted at $f'$, is mounted electromagnet $g$, energized by current supplied thereto by a branch across the mains $g'$, which is made of high resistance, the said magnet being adapted to actuate the contact-arm $f$, moving the same to one side or the other, as the magnetic fields produced by the coils $e$ $e'$ are varied. The lower end $f^2$ of the contact-arm is adapted to engage successively a plurality of stationary contacts $h$ $h'$, provided in the path thereof on either side of its vertical position. The contacts $h$ $h'$ control the circuit through varying amounts of the resistance $k$ $k'$, which are respectively connected with the mains $c$ $c'$, the said resistances being so constructed that wire of larger and larger cross-section is provided for the flow of current as the contact-arm is moved nearer either of the connections with the mains.

With the exception that the branch $g'$ is connected by brushes $g^2$ with the coils of a rotatable magnet or armature $g$, actuating the contact-arm $f$, the description above given will apply equally well to Fig. 1, the two regulating devices shown being otherwise identical. As long as the loads $b$ $b'$ upon both sides of the wire $d$ are equal the device will remain inoperative, since the current flowing in the differential coils $e$ and $e'$ will also be equal, thus neutralizing one another, and the magnet g will remain midway between the two poles. While this continues there will be no current flowing in the wires d d' and contact-arm f will be in its normal position. However, as soon as there is any difference between the load on one side or the other the current flowing in the coils e e' will be correspondingly altered and the arm f moved to one side or the other and cut the necessary amount of resistance out of circuit between the compensating conductor and the corresponding main to reëstablish the balance of the system. For instance, we will assume that two of the translating devices b are cut out of circuit. The coils e will be more highly energized and the magnet g will be repelled by the pole e and attracted by the pole e', and thus will move to the right, actuating the contact-arm into engagement with the contacts h, thereby cutting out of circuit sufficient resistance to compensate for the increase of resistance due to cutting out translating devices b b. Consequently the potential of the left-hand side of the system will be reëstablished. The coils of the magnet will again receive equal current, but the contact-arm will remain in its adjusted position until further unbalanced condition of the circuits actuates said armature again to alter the resistance in circuit with the compensating conductor. Similarly, if translating devices are cut out upon the other side of the system the coil e' would receive more current and the arm f would be moved to the right, cutting out resistance upon that side, and thus compensate for the change. It is evident that the device as thus constructed, with differential windings upon the actuating-magnet, will readily respond to changes in the working circuit and cut in or out of the proper circuit the resistances necessitated by such changes.

In practice I may find it preferable to employ duplex windings in the above device in place of the coils e e', as diagrammatically illustrated in Fig. 3, and I do not wish to be understood as limiting myself to the precise construction shown herein, as my invention contemplates generally the employment of a differentially-wound electromagnet in association with a polarized armature for the regulation of a multiple-series system of electrical distribution, the device shown and described being equally applicable to a system employing more than three wires.

Having described my invention, what I claim as new, and desire to secure by Letters Patent, is—

1. In a system of electrical distribution, the combination with a source of electrical energy, of the mains of a working circuit connected therewith wherein the translating devices are connected in multiple series between the said mains, a compensating conductor, and an electromagnetic device consisting of a polarized element and an element energized by differential coils respectively connected between the compensating conductor and the mains, and means controlled by the actuation of the said electromagnetic device for maintaining the balance of the system, substantially as described.

2. In a multiple-series system of electrical distribution, the combination with a dynamo or other source of electrical energy, of supply-mains, translating devices connected in multiple series between the said supply-mains, a compensating conductor connected with said translating devices, an electromagnet provided with coils differentially wound, which are connected in parallel between the compensating conductor and the mains and in multiple series between the said mains, a polarized armature provided in the field of the said magnet, and means controlled by the movement thereof for maintaining the balance of the system, substantially as described.

3. In a system of electrical distribution, the combination with a source of electrical energy, of translating devices connected in multiple series in the working circuit thereof, a compensating conductor, a circuit-controlling device provided with a polarized element, and coöperating helices differentially wound, the said helices being connected in multiple series with the mains of the system and in parallel with the compensating conductor and the mains, resistances connected respectively with the mains, and a contact-arm connected with the compensating conductor adapted to be actuated by the circuit-controlling device to connect the said compensating conductor with either of the mains through resistance calculated to maintain the balance of the system, substantially as described.

4. In a multiple-series system of electrical distribution, the combination with a dynamo or other source of electrical energy, of supply-mains connecting the same with the working circuit, a neutral or compensating conductor, translating devices, a circuit-controlling device provided with coils differentially wound, the said translating devices and differential coils being respectively connected in parallel between the neutral conductor and the mains and in multiple series between the said mains, a polarized armature energized by a branch across the mains, resistances respectively connected with either of the said mains, and a contact-arm connected with the neutral conductor adapted to be actuated by the armature to connect the said neutral conductor with either side of the system through resistance proportional to the unbalanced condition thereof, substantially as described.

5. In a multiple-series system of electrical distribution, the combination with the source of electrical energy a, of mains c c', neutral or compensating wire d, translating devices b b', an electromagnet whereon are provided differential windings e e', the said translating devices and windings being connected in parallel between the compensating wire and the mains and in multiple series between the said mains, resistances $k\ k'$ respectively connected with the mains $c\ c'$, contact-arm $f$ connected with the wire $d$, and rotatable armature $g$ energized by a branch across the mains, upon which the contact-arm is mounted and adapted to be actuated by the said armature to connect the wire $d$ with either side of the system through variable amounts of resistances $k$ or $k'$, proportional to the lack of balance in the said system, substantially as described.

In witness whereof I hereunto subscribe my name this 21st day of May, A. D. 1896.

CHARLES D. HASKINS.

Witnesses:
  A. L. LAWRENCE,
  D. W. C. TANNER.